Feb. 1, 1966  O. J. ANNESE ETAL  3,231,972
CUTTING TOOL FOR REMOVING NUTS FROZEN TO STUDS
Filed Oct. 4, 1963
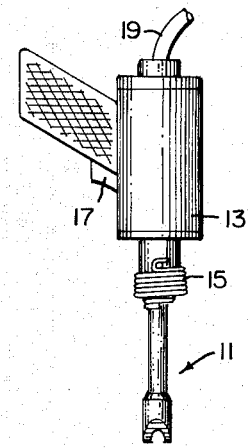
FIG. I
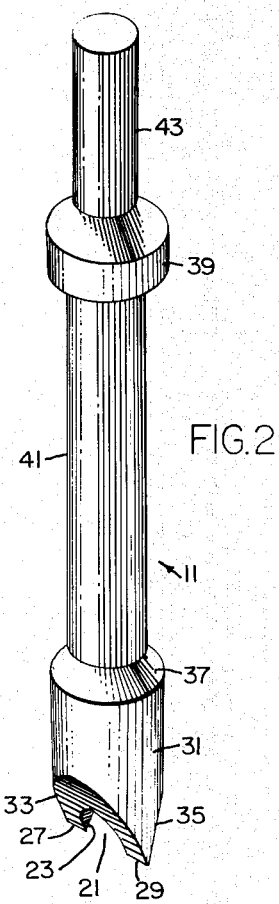
FIG. 2
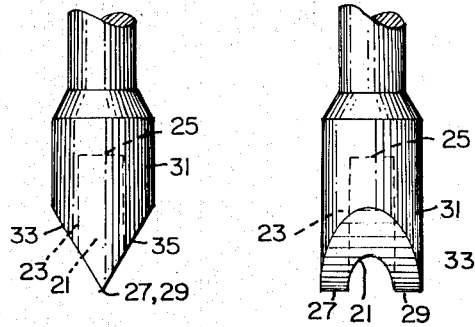
FIG. 3   FIG. 4
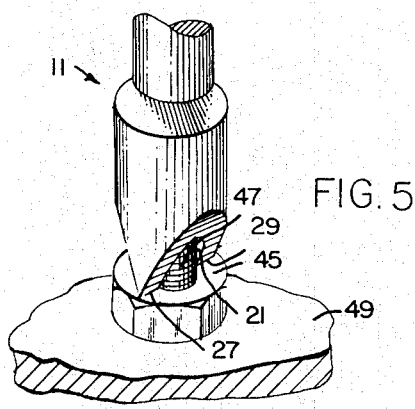
FIG. 5
INVENTORS
ORLANDO JOHN ANNESE
JOHN E. DUPLIN
BY
Ezekiel Wolf, Wolf & Greenfield
ATTORNEYS 3,231,972
CUTTING TOOL FOR REMOVING NUTS
FROZEN TO STUDS
Orlando John Annese, 548 Heath St., Chestnut Hill, Mass., and John E. Duplin, Winthrop, Mass.; said Duplin assignor to said Annese
Filed Oct. 4, 1963, Ser. No. 313,904
1 Claim. (Cl. 30—168)

The present invention relates in general to cutting and more particularly concerns novel methods and means for rapidly releasing a nut that is rusted or otherwise frozen to a bolt. A specific embodiment of the invention actuated by a reciprocating power handle removes a nut from a shock absorber stud extending through the automobile frame in but a few seconds.

It is an important object of this invention to provide methods and means for rapidly removing a nut frozen to a stud.

It is another object of the invention to achieve the preceding object with a cutting tool that is relatively easy and inexpensive to fabricate and easy to use by unskilled personnel with safety.

It is still another object of the invention to provide a cutting tool in accordance with the preceding object which can be reused many times.

It is still another object of the invention to achieve the preceding objects with a cutting tool that may be employed manually or in cooperation with a percussive reciprocating power handle.

According to the invention, means define a cylinder formed with an internal bore defined by an inside wall surrounding the cylinder axis, and means define a plurality of cutting edges extending radially outward from spaced points of the inside wall, a length of the bore immediately adjacent to the cutting edges being clear of all obstructions for accommodating the end of the stud to which the nut to be removed is frozen.

In a more specific form, at least two of the spaced points define a line generally perpendicular to the cylinder axis. Preferably, at least two of the cutting edges define a plane generally perpendicular to the cylinder axis. And still more preferably, at least two of the said cutting edges define a line generally perpendicular to and intersecting the cylinder axis. Preferably the inside wall and the outside wall of the cylinder defining means are concentric about the cylinder axis and the said two cutting edges extend between the inside wall and the outside wall.

In a specific form of the invention the cylinder defining means is formed with contiguous beveled faces sloping away from the said at least two cutting edges and the cylinder axis. A practical embodiment of this invention has two collinear cutting edges.

In accordance with a method according to the invention, the tool is placed over the stud carrying the nut to be removed with the cutting edges in contact with the nut and pressure applied to the other end of the cutting tool and transmitted by the cutting tool to the nut through both cutting edges separated by the stud until the nut is removed.

Numerous other features, objects and advantages of the invention will become apparent from the following specification when read in connection with the accompanying drawing in which:

FIG. 1 is a perspective view of a cutting tool according to the invention fitted in a power percussive gun of the type commonly available in automotive repair shops for imparting reciprocating motion to insertable tools;

FIG. 2 is a perspective view of a specific embodiment of the invention;

FIG. 3 is a view of the lower end of the cutting tool along the cutting edges;

FIG. 4 is a view of the cutting tool along a direction perpendicular to that defined by the cutting edges and the axis of the tool; and FIG. 5 shows a view of the lower end of the cutting tool in position with the bore over the stud to which a nut to be removed is attached and shows the cutting edges in contact with the nut preparatory to transmitting forces applied to the top of the tool to the nut to be removed through the tool including the cutting edges.

With reference now to the drawing and more particularly FIG. 1 thereof, there is shown a view of the novel cutting tool 11 fitted in a power percussive gun 13 with a safety spring 15 helping to prevent unwanted ejection of the tool 11 when the trigger 17 is pulled to cause power to flow through the cable 19 which may deliver compressed air or electricity for producing reciprocating motion of tool 11.

Referring to FIGS. 2–4, there are shown views of the tool helpful in understanding the structure of the illustrated specific embodiment which has been used to remove nuts frozen to shock absorber studs in but a few seconds. The tool includes means defining a cylinder formed with an internal bore 21 defined by the inside wall 23 extending axially inward to the top inside wall 25. The distance from top inside wall 25 to the line defined by cutting edges 27 and 29 is longer than the length of stud extending beyond a nut to be removed from a stud so that the cutting edges 27 and 29 may dig into a nut frozen to the stud sufficiently to free the nut from the stud. Thus, cutting edges 27 and 29 extend radially outward from the inside wall 23 to the outside wall 31. The inside wall 23 and outside wall 31 are concentric about the axis of the tool. Contiguous beveled faces 33 and 35 slope upward and away from the two cutting edges and the cylinder axis. The angle formed by the beveled faces 33 and 35 is preferably of the order of 60° as best seen in FIG. 3.

The tool may be formed with a lower beveled shoulder 37 separated from the upper annular shoulder 39 by the central stem portion 41. An upper stem 43 is adapted to fit in the opening of the power gun 13 with the spring 15 engaging the lower edge of the shoulder 39 to keep the tool in place.

Referring to FIG. 5, there is shown a view of the lower portion of the tool in position for fracturing a nut 45 that is rusted or otherwise frozen to a stud 47 passing through a frame 49. Bore 21 accommodates stud 29 so that the inside wall 23 surrounds that stud and cutting edges 27 and 29 engage the top surface of nut 45. As downward blows are applied to the upper end of tool 11 by the gun 13 or through manual or semiautomatic techniques, the cutting edges 27 and 29 dig into nut 45 until that nut is fractured from stud 47. With a pneumatic impact power tool an embodiment of the invention with a bore of ⅜" diameter and cutting edges 27 and 29 ³⁄₁₆" long with bore 21 having a depth of at least 1½", nuts frozen to studs have been freed from automobile shock absorbers in ten seconds.

The illustrated specific embodiment of the invention was made of solar water hardened steel by first turning a piece of ¾" diameter stock on a lathe to form the intermediate stem 41 with the lower beveled portion 37 and the upper shoulder 39. The lower end was then drilled to form the bore 21. Then the lower end was milled to form the beveled faces 33 and 35 and cutting edges 27 and 29. The tool was then hardened by heating it in an oven elevated to a temperature of 1550° F. for 60 minutes, quenched in a salt solution formed by dissolving about ¼ pound of rock salt in a gallon of tap water, and then drawn in an oven elevated to a temperature of 300° F. for 60 minutes to attain a Rockwell hardness of from 57 to 60.

The specific embodiment described herein is by way of example for illustrating the best mode now contemplated for practicing the invention. It is evident that those skilled in the art may change dimensions, orientation and number of edges, use the tool with a hammer or other means for transmitting forces from the top end of the tool to the nut to be removed through the cutting edges, and/or make numerous other modifications of, departures from and uses of the specific embodiment described herein without departing from the inventive concepts. Consequently, the invention is to be construed as limited solely by the spirit and scope of the appended claim.

What is claimed is:

A cutting tool formed as a unitary structure comprising, means defining a cylinder formed with an internal bore for freely receiving the end of a stud defined by an inside wall continuously surrounding the cylinder axis and concentric with an outside wall of said cylinder defining means about said cylinder axis, and means below said internal bore defining a pair of collinear cutting edges extending radially outward from spaced points of said inside wall for engagement with a nut frozen to said stud which cutting edges define the lowermost portion of said tool, the axial distance between said cutting edges and the uppermost portion of said bore being greater than the thickness of said nut plus the length of said stud above said nut and the axial distance between said cutting edges and the lowermost portion of said inside wall continuously surrounding the cylinder axis being less than the axial distance between said uppermost portion and said lowermost portion, said cylinder defining means being formed with contiguous beveled faces sloping away from said pair of cutting edges and said cylinder axis.

References Cited by the Examiner

UNITED STATES PATENTS

| | | | |
|---|---|---|---|
| 436,306 | 9/1890 | Darling | 145—25 |
| 2,853,723 | 9/1958 | Winslow | 30—168 X |
| 3,000,097 | 9/1961 | Hartz | 29—427 |

WILLIAM FELDMAN, *Primary Examiner.*

MILTON S. MEHR, *Examiner.*